(12) United States Patent
Winn et al.

(10) Patent No.: US 8,395,074 B2
(45) Date of Patent: Mar. 12, 2013

(54) PLASMA ARC SYSTEMS WITH CUTTING AND MARKING FUNCTIONS

(75) Inventors: Jackie L. Winn, Mt. Pleasant, SC (US); Jesse M. Wilson, Hanahan, SC (US); Charles T. Boyd, Goose Creek, SC (US)

(73) Assignee: Kaliburn, Inc., Ladson, SC (US)

( * ) Notice: Subject to any disclaimer, the term of this patent is extended or adjusted under 35 U.S.C. 154(b) by 0 days.

(21) Appl. No.: 12/959,841

(22) Filed: Dec. 3, 2010

(65) Prior Publication Data

US 2012/0138583 A1 Jun. 7, 2012

(51) Int. Cl.
*B23K 10/00* (2006.01)
(52) U.S. Cl. .......... 219/121.39; 219/121.55; 219/121.54
(58) Field of Classification Search ............. 219/121.36, 219/121.54, 121.57, 75, 121.39, 121.45; 315/111.51
See application file for complete search history.

(56) References Cited

U.S. PATENT DOCUMENTS

| | | | |
|---|---|---|---|
| 5,630,952 A * | 5/1997 | Karino et al. ............ | 219/121.57 |
| 6,236,013 B1 | 5/2001 | Delzenne | |
| 6,335,505 B2 | 1/2002 | Billerot | |
| 6,677,551 B2 | 1/2004 | Hardwick | |
| 7,411,149 B2 | 8/2008 | Schneider | |
| 7,573,000 B2 | 8/2009 | Blankenship et al. | |
| 2002/0056708 A1 | 5/2002 | Moriguchi et al. | |
| 2009/0159571 A1 | 6/2009 | Salsich | |
| 2009/0159575 A1* | 6/2009 | Salsich ................... | 219/121.54 |
| 2011/0220619 A1* | 9/2011 | Mehn ............................ | 219/108 |

OTHER PUBLICATIONS

Jackie L. Winn U.S. Appl. No. 12/649,727, filed Dec. 30, 2009 Pulse Width Modulation Control of Gas Flow for Plasma Cutting and Marking.

* cited by examiner

*Primary Examiner* — Mark Paschall
(74) *Attorney, Agent, or Firm* — Dority & Manning, P.A.

(57) ABSTRACT

A plasma arc system includes a single-gas, gas-cooled plasma arc torch and a torch control unit. The torch control unit includes a housing and a user input device on the housing for receiving an indication of a desired cutting or marking function and for providing a responsive signal. A single gas supply both to the housing, and from the housing to the torch, is provided for cutting or marking. A current control device is located within the housing for controlling current output to the torch for either cutting or marking. A gas control device is located within the housing for controlling gas output to the torch for either cutting or marking. A controller is located within the housing for receiving the signal from the user input device indicating the desired cutting or marking function, and for sending a responsive signal to the current control and gas control devices depending on the desired cutting or marking function so that the torch operates accordingly. A related control until is disclosed.

6 Claims, 3 Drawing Sheets

PLASMA ARC SYSTEMS WITH CUTTING AND MARKING FUNCTIONS

FIELD OF THE INVENTION

The present invention relates to plasma arc systems capable of performing both a cutting and a marking function.

BACKGROUND OF THE INVENTION

Plasma cutting tools used to cut or otherwise operate on a workpiece typically comprise a gas nozzle with an electrode therein. Generally, plasma tools direct gas through a nozzle toward the workpiece, with some or all the gas ionized in a plasma arc between the electrode and the workpiece. The arc is used to cut, mark or otherwise operate on the workpiece.

In most tools, a pilot arc is first established between the electrode and the nozzle. Then, the pilot arc is transferred from the nozzle to the workpiece for cutting and/or other operations. For example, some tools use contact-based starting, with the electrode and nozzle initially in contact with one another. While current is passing through the electrode and nozzle, the electrode and nozzle are moved apart to create a gap. A spark across the gap initiates the pilot arc in a successful starting operation.

Other tools use non-contact starting, which can advantageously avoid wear on the electrode that is aggravated by contact during starting and can also avoid the need to have more complexity in terms of additional moving parts to bring the nozzle and electrode into and out of contact. To initiate a plasma arc in a non-contact start, a high electric potential must be generated between the spaced apart nozzle (which acts as the anode) and the electrode (which acts as the cathode). The generated voltage must exceed the break over voltage associated with the air gap between the nozzle and electrode. The break over voltage can be influenced by factors such as distance between nozzle and electrode, type of gas present, velocity of gas flow, and nozzle and electrode geometry.

Plasma arc torches can be used to cut through a material or to mark a material by not cutting all the way through. Devices that perform both functions are often complex, including substantial parallel equipment for the cutting and the marking functions. Multiple power and gas supplies, multiple housings and control equipment elements are often required. Accordingly, a simplified and effective system for providing both cutting and marking function with a single gas, air cooled torch would be welcome.

SUMMARY OF THE INVENTION

According to certain aspects of the disclosure, a plasma arc system includes a single-gas, gas-cooled plasma arc torch and a torch control unit. The torch control unit includes a housing and a user input device on the housing for receiving an indication of a desired cutting or marking function and for providing a responsive signal. A single gas supply both to the housing, and from the housing to the torch, is provided for either cutting or marking. A current control device is located within the housing for controlling current output to the torch for either cutting or marking. A gas control device is located within the housing for controlling gas output to the torch for either cutting or marking. A controller is located within the housing for receiving the signal from the user input device indicating the desired cutting or marking function, and for sending a responsive signal to the current control and gas control devices depending on the desired cutting or marking function so that the torch operates accordingly. Various options and modifications are possible.

According to other aspects of the disclosure, a control unit is provided for use with a single-gas, gas-cooled plasma arc torch system. The control unit includes a housing and a user input device on the housing for receiving an indication of a desired cutting or marking function and for providing a responsive signal. A single gas supply both to the housing, and from the housing to the torch, is provided for either cutting or marking. A current control device is located within the housing for controlling current output to the torch for either cutting or marking. A gas control device is located within the housing for controlling gas output to the torch for either cutting or marking. A controller is located within the housing for receiving the signal from the user input device indicating the desired cutting or marking function, and for sending a responsive signal to the current control and gas control devices depending on the desired cutting or marking function so that the torch operates accordingly. As above, various options and modifications are possible.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Briefly, the technology of interest pertains to plasma arc system having both a cutting and a marking function. The torch system is a single gas system (as opposed to a multiple gas system), and is gas cooled (as opposed to liquid cooled). The device may be configured for a non-contact (electrode and nozzle) start but is not limited to such. An onboard controller, microprocessor, etc. controls the torch start sequence, the working current for either cutting or marking via an inverter circuit, and the gas flow, based on user input. If desired, gas flow control may include a pulse width modulation system, fixed orifice, or proportional valve. Also, the system conveniently includes all power and gas and control equipment in a single housing.

The present disclosure is therefore generally directed to a plasma arc system useful for marking as well as cutting a workpiece. The device could include a mechanized torch assembly or a hand-held torch assembly. Various types and sizes of torches are possible at varying currents if desired.

Figure 1:
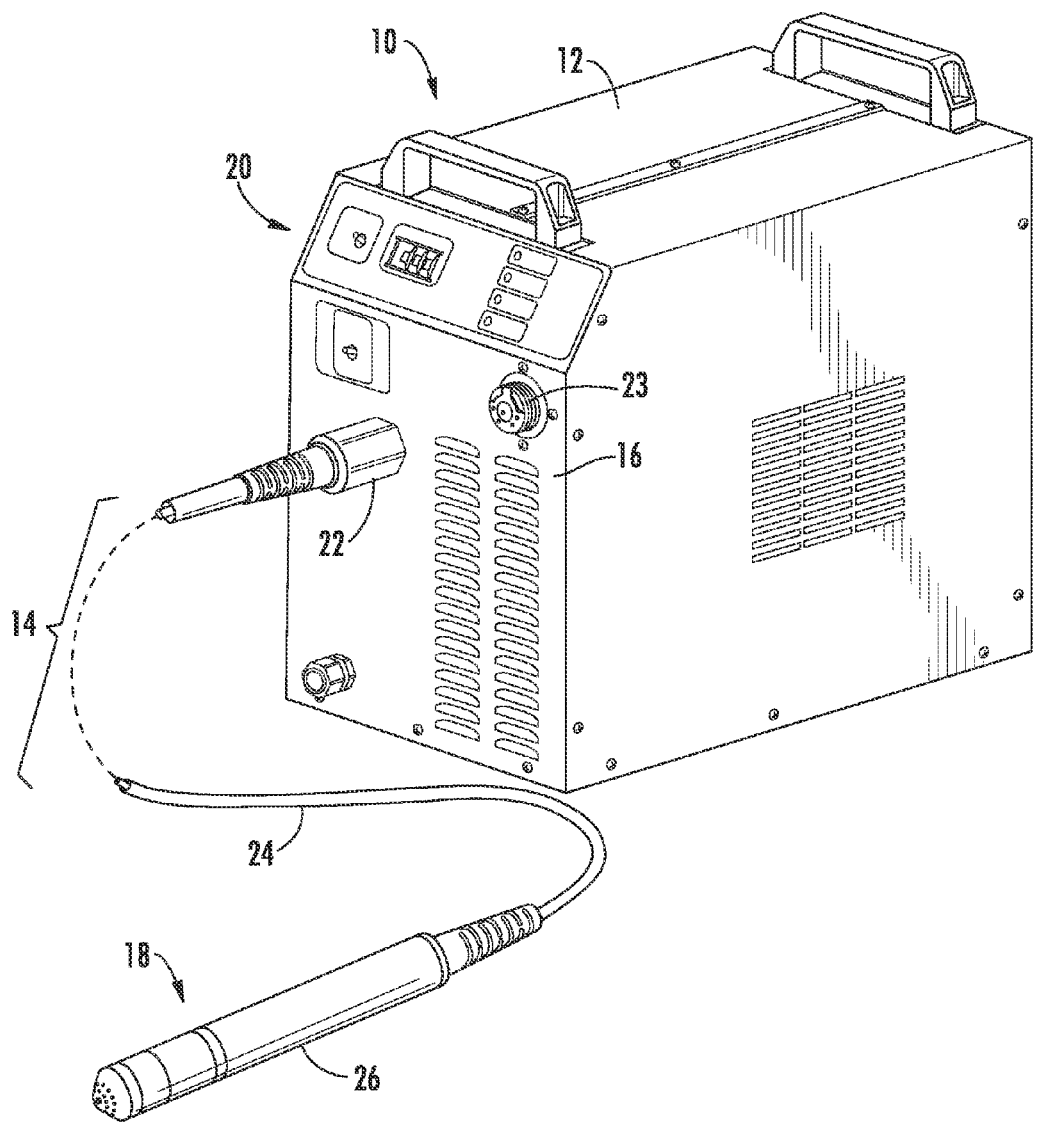
FIG. 1 is a perspective view of one example of a plasma arc torch system according to certain aspects of the disclosure.

FIG. 1 shows one example of such a plasma arc system 10. As shown, system 10 includes a control unit having a housing 12 with a connected torch assembly 14. Housing 12 includes the various conventional components for controlling a plasma arc, such as a power supply, a plasma starting circuit, air regulators, input and output electrical and gas connectors, controllers, etc. Torch assembly 14 is attached to a front side 16 of housing. Torch assembly 14 includes within it electrical connectors to connect an electrode and a nozzle within the torch end 18 to electrical connectors within housing 12. Separate electrical pathways may be provided for a pilot arc and a working arc, with switching elements provided within housing 12. A gas conduit is also present within torch assembly to transfer the gas that becomes the plasma arc to the torch tip, as will be discussed later. Various user input devices 20 such as buttons, switches and/or dials may be provided on housing 12, along with various electrical and gas connectors.

It should be understood that the housing 12 illustrated in FIG. 1 is but a single example that could employ aspects of the inventive the concepts disclosed herein. Accordingly, the general disclosure and description above should not be considered limiting in any way as to the types or sizes of plasma arc systems that could employ the disclosed elements. Particular components and controls will be discussed in detail below with reference to FIG. 4.

As shown in FIG. 1, torch assembly 14 includes a connector 22 at one end for attaching to a mating connector 23 of housing 12. When connected in such way, the various electrical and gas passageways through the hose portion 24 of torch assembly 14 are connected so as to place the relevant portions of torch body 26 in connection with the relevant portions within housing 12.

Figure 2:
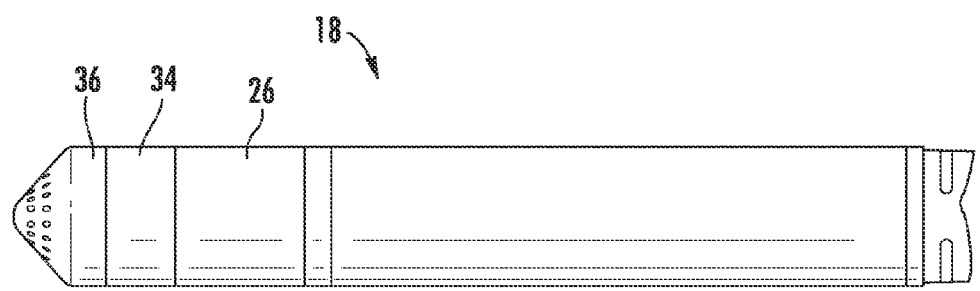
FIG. 2 is a perspective view of the torch portion of the system of FIG. 1.
Figure 3:
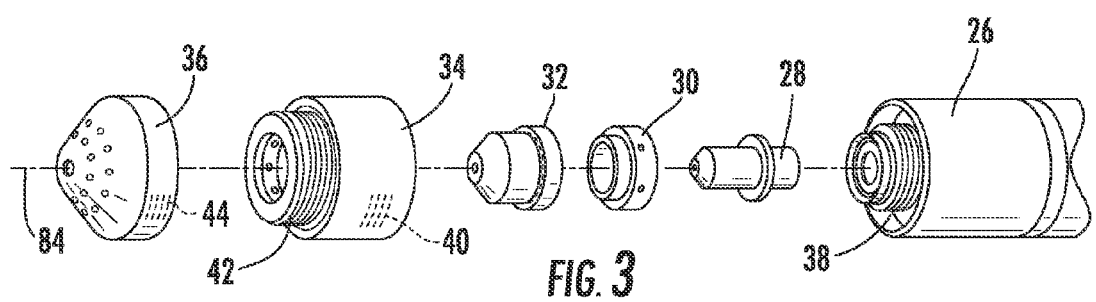
FIG. 3 is an exploded perspective view of the end of the torch portion of FIG. 2.

FIG. 3 shows an exploded view of the end of torch body 26. As shown therein, attached to torch body 26 are electrode 28, swirl ring 30, nozzle 32, retaining cap 34, and shield cap 36. First mating threads 38 and 40 on torch body 26 and retaining cap 34, and second mating threads 42 and 44 on retaining cap 34 and shield cap 36 may be used to hold these pieces together on the end of torch body 26 in the configuration shown in FIG. 2. As illustrated, torch body 26 is a non-contact start device. However, it should be understood that the inventive concepts herein also apply to devices using a conventional contact start with relatively movable nozzles and electrodes. The sizes, dimensions and arrangements of these elements may be varied somewhat depending on the desired amperage, flow, work to be performed, contact or non-contact starting, etc. as is conventional, and additional parts may be employed in some arrangements depending on the application.

Figure 4:
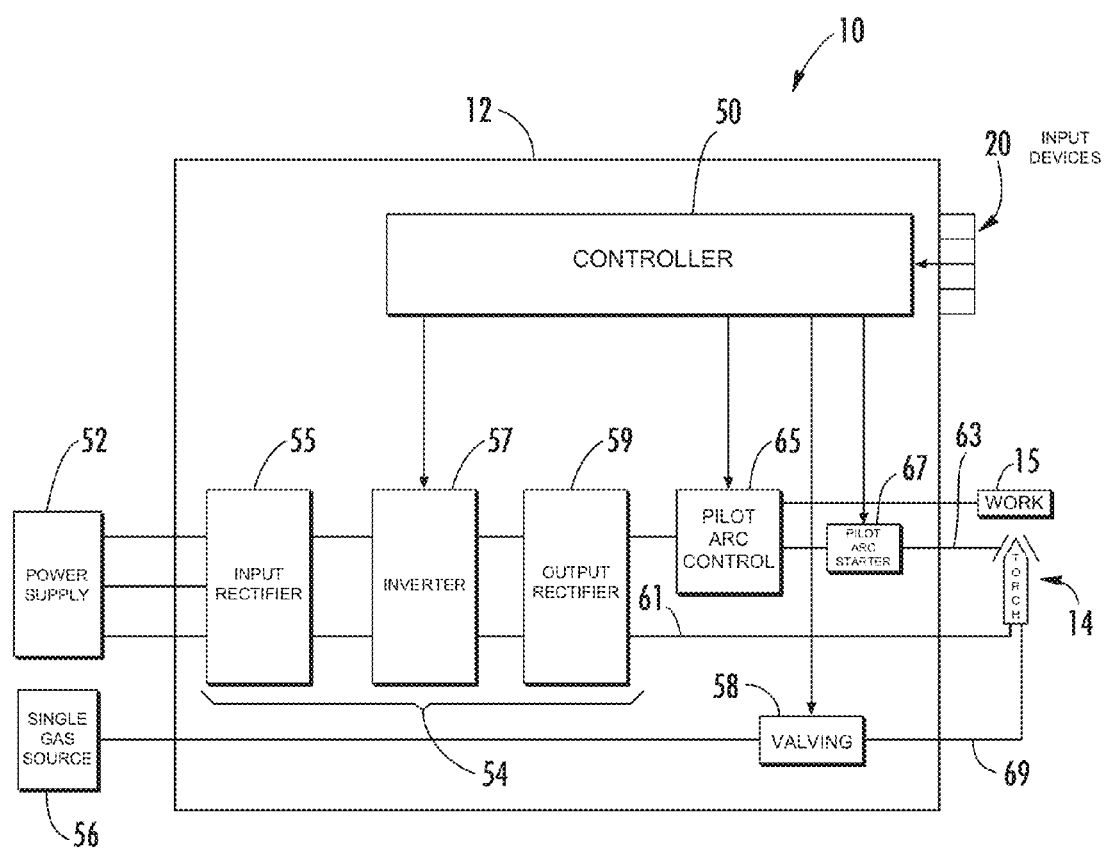
FIG. 4 is a diagram illustrating the functional connection of components of system according to certain aspects of the present disclosure.

FIG. 4 diagrammatically shows the arrangement of the plasma arc system according to certain aspects of the invention. As shown, device 10 includes housing 12 and torch assembly 14, as mentioned above. Element 15 represents the work item being cut or marked. A conventional controller 50 is provided within housing 12 to control various aspects of the device 10. Accordingly, controller 50 could comprise a digital signal processor, microprocessor, programmable gate array control or the like, a memory, and control software. Controller 50 directs operation of all aspects of device 10.

An external power supply 52 is connected to an inverter power control circuit 54 the output of which helps provide fast response for the control of plasma current in use. As shown, circuit 54 may include an input rectifier 55, an inverter 57, and an output rectifier 59. The output 61 of circuit 54 provides a DC signal to torch 14 that can be delivered at a first level (such as 10 A) for marking and a second level (such as 100 A) for cutting. Controller 50 directs circuit 54 to provide the desired output based on input given by a user via input devices 20. For starting torch 14, controller 50 can direct a pilot arc 63 be generated via a pilot arc control 65 and a pilot arc starter 67.

A single gas source 56 is provided to housing 12 with gas pressure and flow control means such as internal valving 58 controlled by controller 50 to provide a gas flow 69 desired for either marking or cutting. If desired, such valving could incorporate pulse width modulation as disclosed in Assignee's co-owned U.S. patent application Ser. No. 12/649,727, filed Dec. 30, 2009, incorporated by reference herein. The plasma arc ignition control and starter 65,67 may be as disclosed in Assignee's co-owned U.S. patent application Ser. No. 11/860,735, filed Sep. 25, 2007. The power supply control circuit 54 may be as disclosed in Assignee's co-owned U.S. patent application Ser. No. 12/649,788, filed Dec. 30, 2009, all are also incorporated by reference herein.

Each of the elements noted above are controlled by controller 50 based on inputs provided by the user via user input devices 20. A single gas connection to housing 12 and to torch assembly 14 is thus possible. All controls are maintained onboard on housing 12. Both marking and cutting can be performed by a user upon demand using a single device. All necessary connections to the torch are accomplished through single hose portion 24, which can therefore carry ignition and working current to the electrode and nozzle as well as working gas. Device 10 thus provides an integrated, solution, maintained in a single housing making available a number of plasma torch functional options, both for cutting and marking.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments.

Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A plasma arc system for use with a workpiece, the system comprising:
    a single-gas, gas-cooled plasma arc torch; and
    a torch control unit including:
        a housing;
        a user input device on the housing for receiving an indication of a desired cutting or marking function, the cutting function including cutting completely through the workpiece and the marking function including surface marking the workpiece, the user input device also providing a responsive signal based on the indication;
        a single gas supply to the housing for cutting or marking;
        a single gas supply from the housing to the torch for cutting or marking;

current control means within the housing for controlling current output to the torch for either cutting or marking;

gas control means within the housing for controlling gas output to the torch for either cutting or marking; and a controller within the housing for receiving the signal from the user input device indicating the desired cutting or marking function, and for sending a responsive signal to the current control means and to the gas control means depending on the desired cutting or marking function so that the torch respectively either cuts completely through the workpiece or surface marks the workpiece.

2. The plasma arc system of claim 1, further including a power supply within the housing outputting a rectified DC signal received from a high frequency AC inverter; the power supply outputting a working current at a first level for cutting and a second level for marking.

3. The plasma arc system of claim 1, wherein the torch includes an electrode and a nozzle arranged for a non-contact start.

4. The plasma arc system of claim 1, wherein the torch includes an electrode and a nozzle arranged for a contact start.

5. A control unit for use with a single-gas, gas-cooled plasma arc torch system, the control unit comprising a housing;

a user input device on the housing for receiving an indication of a desired cutting or marking function, the cutting function including cutting completely through the workpiece and the marking function including surface marking the workpiece, the user input device also providing a responsive signal based on the indication;

a single gas supply to the housing for cutting or marking;

a single gas supply from the housing to the torch for cutting or marking;

current control means within the housing for controlling current output to the torch for either cutting or marking;

gas control means within the housing for controlling gas output to the torch for either cutting or marking; and a controller within the housing for receiving the signal from the user input device indicating the desired cutting or marking function, and for sending a responsive signal to the current control means and to the gas control means depending on the desired cutting or marking function so that the torch respectively either cuts completely through the workpiece or surface marks the workpiece.

6. The control unit of claim 5, further including a power supply within the housing outputting a rectified DC signal received from a high frequency AC inverter; the power supply outputting a working current at a first level for cutting and a second level for marking.

* * * * *